July 13, 1943.                C. N. GREER                2,324,296
                               FISH SCREEN
                          Filed Dec. 10, 1941         2 Sheets-Sheet 1
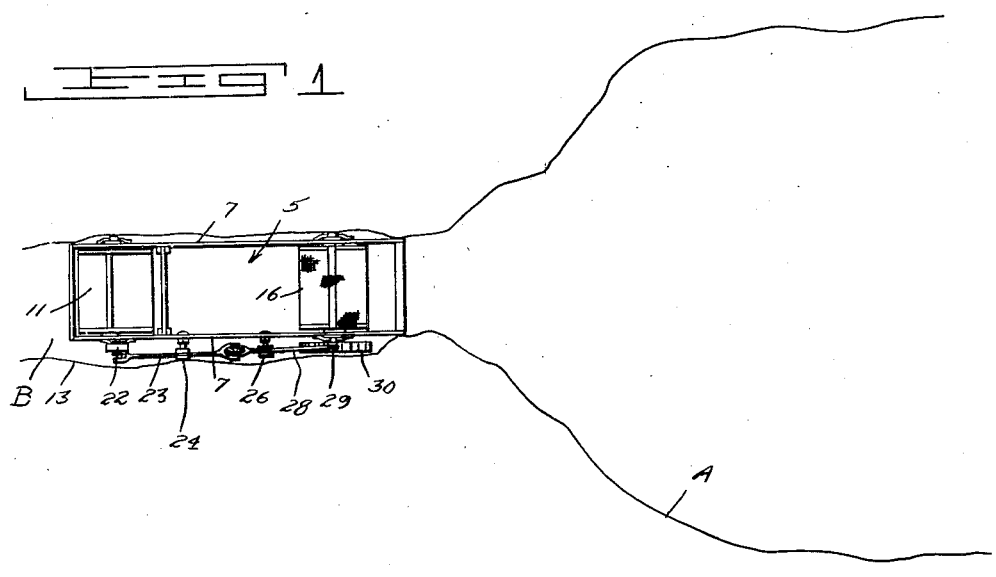
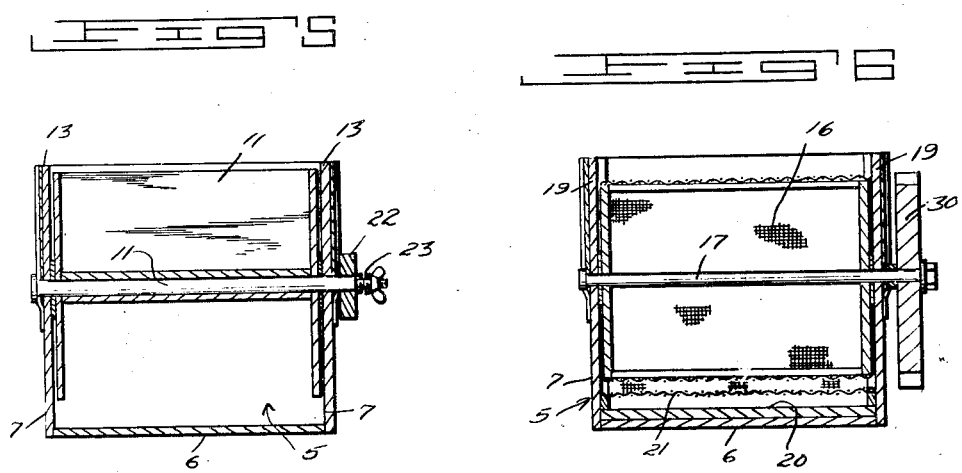
Inventor
Calvin N. Greer
By  Clarence A. O'Brien
Attorney

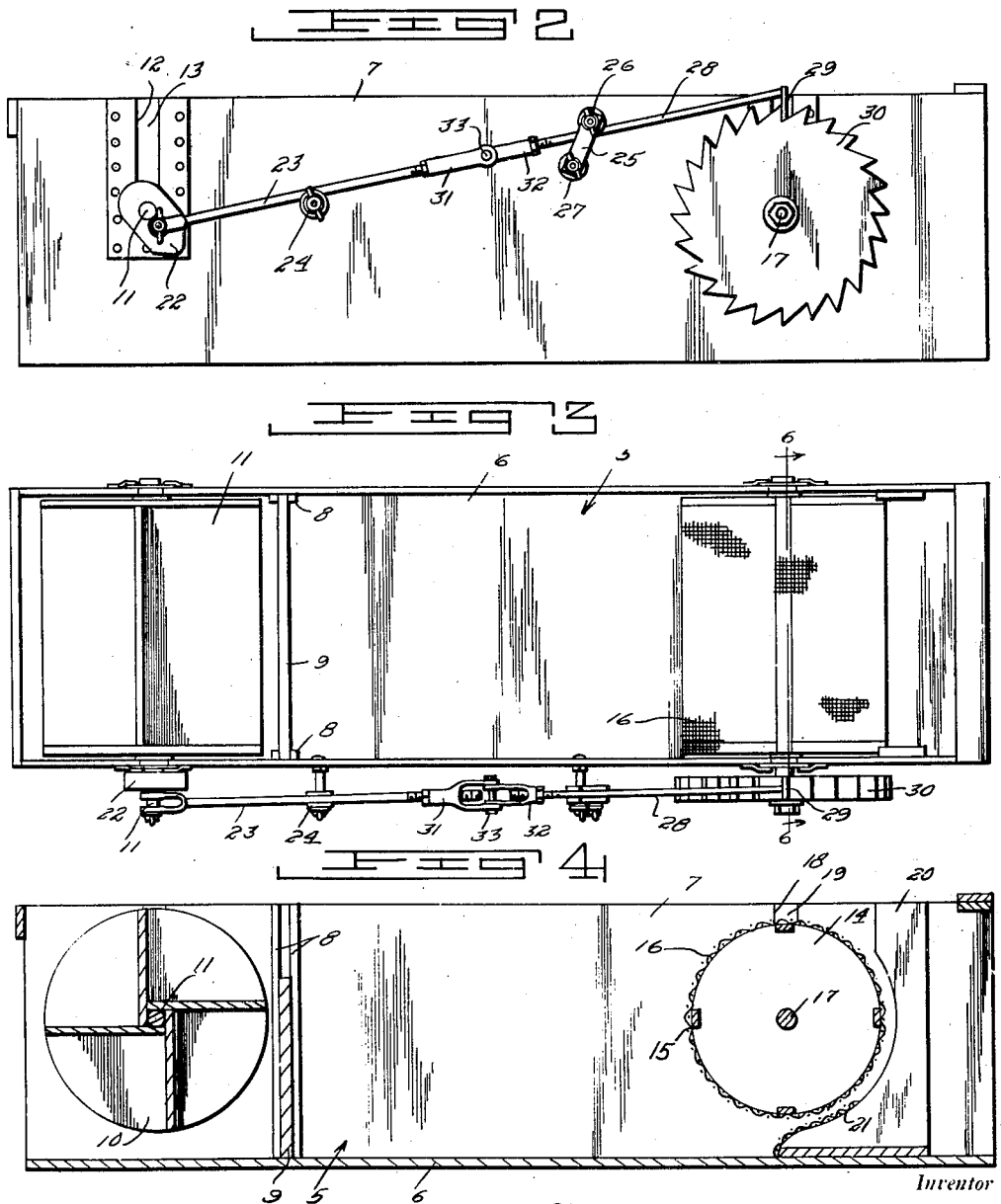

Patented July 13, 1943

2,324,296

UNITED STATES PATENT OFFICE 2,324,296

FISH SCREEN

Calvin N. Greer, Payson, Ariz.

Application December 10, 1941, Serial No. 422,448

1 Claim. (Cl. 210—173)

This invention appertains to new and useful improvements in fish screens and more particularly to a screen for use in conjunction with fish ponds for the purpose of maintaining the ponds sanitary without likelihood of losing small fish.

The principal object of the present invention is to provide a debris and scum removing apparatus for the ponds of fish farms which will automatically operate to remove surface foreign matter without likelihood of also destroying small fish at the same time.

Other objects and advantages of the invention will become apparent to the reader of the following description.

In the drawings:

Figure 1 represents a top plan view showing a fish pond and outlet with the cleaning apparatus installed in the outlet.

Figure 2 is a side elevational view of the cleaning apparatus.

Figure 3 is a top plan view.

Figure 4 is a longitudinal sectional view.

Figure 5 is a transverse section.

Figure 6 is also a transverse section taken substantially on the line 6—6 of Figure 4.

Referring to the drawings wherein like numerals designate like parts, it can be seen that reference character A denotes a fish pond while reference character B represents an outlet stream for the pond, to the end, of course, that the pond is always maintained at a certain high level.

The purpose of the present invention is to provide an automatic apparatus which will not only clean scum and other foreign matter from the surface of the pond but which will also maintain a definite high level of the pond.

The present invention is generally referred to by numeral 5 and consists of a bottom 6 having side walls 7, 7. Near the outer end of the structure, the inner sides of the walls 7 have guide strips 8 secured thereto to define guideways for the ends of a wall 9 which determines the level at which the pond will overflow and thereby maintain the water in the pond at a definite high level. This also defines a rear end compartment in which a paddle wheel 10 is located and suitably attached to a shaft 11 which extends through the side walls 7, 7. The walls 7, 7 at the paddle wheel 10 have vertically extending slots 12 therein through which the ends of the shaft 11 can be lifted when the paddle wheel 10 is to be removed. Suitable closure members 13 can be provided for these slots.

In the forward end of the structure is a drum which comprises a pair of disk-shaped end members 14 bridged by slats 15 and a cylindrical wall 16 is secured to these end members 14 and slats 15, this cylindrical wall 16 being of mesh material. The drum is carried by a shaft 17 which extends through the side walls 7, 7, the side walls being formed with vertically extending slots 18 through which the shaft 17 can be removed whenever desired. Filler strips 19 are provided for the slots 18.

A pair of cleats 20 are provided for the insides of the walls 7, 7, these cleats being curved at their lower portions to accommodate the curvature of the drum wall 16, and under the drum, the lower portions of the cleats 20 are bridged by an apron 21 of mesh material.

The proximity of the apron 21 to the drum wall 16 is very close so as to exclude the possibility of small fish getting beyond the drum 16.

A crank member 22 is provided at one end of the paddle wheel shaft 11 and to this is attached one end of a rod 23 which rides a roller 24 on the outer side of one of the walls 7.

A structure 25 suitably secured to the same wall as a pair of rollers 26, 27 mounted thereon for guiding a circular rod 28 which has a tooth 29 at one end for engaging the teeth of a ratchet wheel 30 located on the corresponding end of the mesh drum carrier shaft 17. The opposed ends of the rods 23, 28 are threadedly disposed into turnbuckle sections 31, 32 which are hingedly connected together as at 33.

It can now be seen that with the parts as shown in Figure 2, and water flowing over the overflow wall 9, the paddle wheel 10 will be operated and a reciprocatory action of the connecting line between the crank 22 and the tooth 29 will be effected. In other words, the tooth 29 will be moved to the right in Figure 1 to engage over a tooth and during this interim the drum 16 will be stationary so that any small fish caught thereby will have an opportunity to slide off or otherwise dislodge themselves. On the return stroke of the tooth 29, the ratchet wheel 30 is, of course, operated and effects a movement of the drum 16 to the end that scum and other foreign matter on the surface of the pond which has been carried to the drum by natural current in the pond will be lifted and eventually will be dumped into the chamber between the drum 16 and the overflow wall 9.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fish screen of the character described comprising a trough-like structure, a paddle wheel mounted in one end of the trough-like structure, a rotary screen mounted in the other end portion of the trough-like structure, an overflow wall in the trough-like structure adjacent the paddle wheel and inwardly thereof to establish a high overflow level in the trough, and operative connections between the paddle wheel and the rotary screen comprising a ratchet wheel fast on one end of said screen, a driving pawl for the ratchet wheel, a crank fast on one end of said paddle wheel, and rod connections between said crank and said pawl.

CALVIN N. GREER.